(12) United States Patent
Zaier

(10) Patent No.: US 8,805,582 B2
(45) Date of Patent: Aug. 12, 2014

(54) ROBOT CONTROL APPARATUS

(75) Inventor: Riadh Zaier, Dar Chaabane (TN)

(73) Assignee: Fujitsu Limited, Kawasaki (JP)

( * ) Notice: Subject to any disclaimer, the term of this patent is extended or adjusted under 35 U.S.C. 154(b) by 886 days.

(21) Appl. No.: 12/363,783

(22) Filed: Feb. 1, 2009

(65) Prior Publication Data

US 2009/0306824 A1    Dec. 10, 2009

(30) Foreign Application Priority Data

Feb. 1, 2008   (JP) ................. 2008-023263

(51) Int. Cl.
  *G05B 19/04*   (2006.01)
  *G05B 19/18*   (2006.01)
  *B62D 57/032*  (2006.01)

(52) U.S. Cl.
  CPC .................. *B62D 57/032* (2013.01)
  USPC ......................... 700/250; 700/245

(58) Field of Classification Search
  None
  See application file for complete search history.

(56) References Cited

U.S. PATENT DOCUMENTS

| | | | | |
|---|---|---|---|---|
| 5,343,397 A * | 8/1994 | Yoshino et al. | ................. | 701/23 |
| 5,357,433 A * | 10/1994 | Takenaka et al. | ............... | 701/23 |
| 5,378,969 A * | 1/1995 | Haikawa | ................. | 318/568.12 |
| 5,402,050 A * | 3/1995 | Ozawa | ..................... | 318/568.12 |
| 5,739,655 A * | 4/1998 | Torii et al. | ................ | 318/568.12 |
| 5,974,366 A * | 10/1999 | Kawai et al. | .................. | 702/150 |
| 6,064,167 A | 5/2000 | Takenaka et al. | | |
| 6,317,652 B1 * | 11/2001 | Osada | .......................... | 700/245 |
| 6,480,761 B2 * | 11/2002 | Ueno et al. | .................... | 700/245 |
| 6,505,096 B2 * | 1/2003 | Takenaka et al. | ............. | 700/245 |
| 6,580,969 B1 * | 6/2003 | Ishida et al. | .................. | 700/245 |
| 6,721,679 B2 * | 4/2004 | Aoyama | ....................... | 702/158 |
| 6,802,382 B2 * | 10/2004 | Hattori et al. | .................. | 180/8.6 |
| 6,901,313 B2 * | 5/2005 | Mori et al. | ..................... | 700/245 |
| 6,917,175 B2 * | 7/2005 | Hattori et al. | ................. | 318/567 |
| 6,920,374 B2 * | 7/2005 | Takenaka et al. | ............. | 700/245 |
| 7,013,201 B2 * | 3/2006 | Hattori et al. | ................ | 700/245 |
| 7,053,577 B2 * | 5/2006 | Nagasaka | ................ | 318/568.12 |
| 7,112,938 B2 * | 9/2006 | Takenaka et al. | ........ | 318/568.12 |
| 7,120,518 B2 * | 10/2006 | Takenaka et al. | ............. | 700/245 |
| 7,127,326 B2 * | 10/2006 | Lewis | ........................... | 700/258 |
| 7,236,852 B2 * | 6/2007 | Moridaira et al. | ............. | 700/245 |
| 7,269,480 B2 * | 9/2007 | Hashimoto et al. | ........... | 700/259 |
| 7,398,136 B2 * | 7/2008 | Higaki et al. | ................. | 700/255 |
| 7,482,775 B2 * | 1/2009 | Zaier | ........................ | 318/568.12 |
| 7,529,622 B2 * | 5/2009 | Nakamura et al. | ............ | 701/301 |
| 7,653,216 B2 * | 1/2010 | Kanade et al. | ................ | 382/106 |
| 7,877,165 B2 * | 1/2011 | Sugiyama et al. | ............. | 700/245 |
| 2002/0022907 A1 * | 2/2002 | Takenaka et al. | ............. | 700/245 |

(Continued)

FOREIGN PATENT DOCUMENTS

JP   2005-96068 A    4/2005
JP   2007-175809 A   7/2007

*Primary Examiner* — Bhavesh V Amin
(74) *Attorney, Agent, or Firm* — Fujitsu Patent Center

(57) ABSTRACT

A robot control method controls walking of a robot. The method generates control information based on postures at a plurality of differing points. The differing points include a reference posture in which the robot is standing independently without falling over. The method controls the robot to carry out a walking operation and detect an obstacle in a place in which a robot leg lands. The method also instructs the robot to carry out rolling onto a supporting leg and returning a swing leg to a position before swinging, to invert a compliance control gain and to bend the supporting leg by an amount while extending the swing leg by the amount.

16 Claims, 17 Drawing Sheets

(56) References Cited

U.S. PATENT DOCUMENTS

| | | | |
|---|---|---|---|
| 2003/0014779 A1* | 1/2003 | Drotning | 901/2 |
| 2004/0030455 A1* | 2/2004 | Hirai et al. | 700/259 |
| 2005/0113973 A1 | 5/2005 | Endo et al. | |
| 2006/0184276 A1* | 8/2006 | Takenaka et al. | 700/245 |
| 2007/0135933 A1* | 6/2007 | Panesse et al. | 700/17 |
| 2007/0145330 A1 | 6/2007 | Suzuki | |

* cited by examiner

ROBOT CONTROL APPARATUS

CROSS-REFERENCE TO RELATED APPLICATION

This application is based upon and claims the benefit of priority of the prior Japanese Patent Application No. 2008-23263, filed on Feb. 1, 2008, the entire contents of which are incorporated herein by reference.

FIELD

Embodiments relate to a robot control apparatus, a robot control method, and a computer-readable recording medium storing a robot control program that control a walking of a robot. In particular, embodiments relate to a robot control apparatus, a robot control method, and a computer-readable recording medium storing a robot control program which reduces the likelihood or prevents a robot from falling over, even in the event that a swing leg comes into contact with an obstacle.

BACKGROUND

In recent years, a humanoid robot and controlling walking operations of a humanoid robot has attracted the attention of a large number of researchers. A majority of research relating to the walking of the humanoid robot uses a ZMP (Zero Moment Point) norm. The ZMP norm controls the robot to keep a ZMP inside a supporting polygon. With this approach, the humanoid robot, and an ambient environment of the robot, may be modeled, and a differential equation may be solved. However, the modeling is difficult when there is an unknown factor. Furthermore, as it takes time to solve the differential equation, real time control of the robot is difficult.

As another approach, there is a method which does not use the ZMP norm. For example, there is an already known technology which, using a cyclic motion of a movable portion of the robot, adjusts phases of the cyclic motion in such a way that a posture of the robot stabilizes (for example, JP-A-2005-96068). Herein, a movable portion is a leg or arm of the robot.

Also, a technology is described in JP-A-2007-175809 which, while rendering unnecessary the modeling of the humanoid robot and the ambient environment of the robot, controls effectively in such a way that the humanoid robot may stably carry out various motions.

Also, a technology has also been developed which, in the event that an obstacle is placed on a walking surface, or in the event that there is an unevenness in the walking surface, controls the robot in such a way that the center of gravity of the humanoid robot becomes lower, in order to prevent the humanoid robot from falling over (refer to the description of U.S. Pat. No. 6,064,167).

SUMMARY

However, in the above discussed related art, in the event that the center of gravity has already moved to the swing leg at a point an obstacle is detected, the likelihood of the robot falling over is high. Example embodiments reduce the likelihood and/or prevent the robot from falling over, even in the event that a swing leg comes into contact with an obstacle.

According to an embodiment, a robot control method which controls walking of a robot is provided. The method generates control information based on postures at a plurality of differing points. The differing points include a reference posture in which the robot is standing independently without falling over. The method controls the robot to carry out a walking operation and detect an obstacle in a place in which a robot leg lands. The method also instructs the robot to carry out rolling onto a supporting leg and returning a swing leg to a position before swinging, to invert a compliance control gain and to bend the supporting leg by an amount while extending the swing leg by the amount.

It is to be understood that both the foregoing summary description and the following detailed description are explanatory as to some embodiments of the present invention, and not restrictive of the present invention as claimed.

BRIEF DESCRIPTION OF DRAWINGS

Embodiments are illustrated by way of example and not limited by the following figures.

DETAILED DESCRIPTION OF EXAMPLES OF EMBODIMENTS

Figure 1:
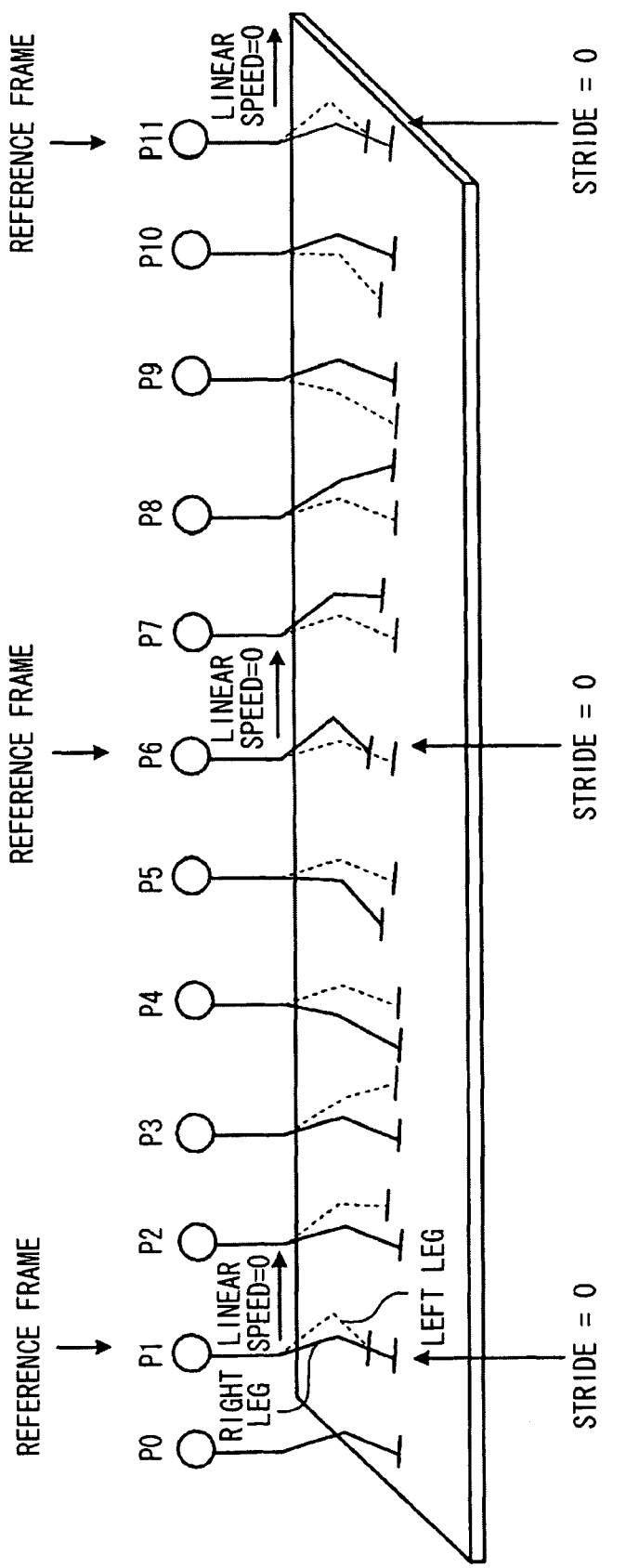
FIG. 1 is a diagram illustrating a robot walking according to an embodiment.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

Hereafter, referring to the attached drawings, a detailed description of an example of an embodiment of a robot control apparatus is provided.

FIG. 1 is a diagram illustrating a robot walking. Herein, a right leg of the robot is expressed by a solid line, and a left leg of the robot by a dashed line. Herein, a plurality of frames Pi defining various postures during a robot walking motion are set in the robot control apparatus. The postures may be sent prior to the walking motion, for example. To be precise, the frames define parameters such as angles of the robot joints, for example.

In FIG. 1, 12 frames, from P0 to P11, are depicted. However, this frame quantity is optional. The frame P0 expresses a posture, before walking, in which the robot is standing independently without falling over. The frames P1, P6 and P11 are also postures in which the robot is standing independently without falling over, and not moving.

For example, in the frame P6, a linear speed of the robot is zero, the robot is standing on only its left leg, and a stride is zero. Conditions of the robot in the frame P1 and the frame P11 are substantially the same. That is, in the frames P1 and P11, the linear speed of the robot is zero, the robot is standing on only its right leg, and the stride is zero. The stride being zero indicates that both the robot legs are together. As the robot is standing independently and the stride is zero in the frames P1, P6 and P11, these frames are referred to as reference frames.

A switch from one frame to another frame is carried out by interpolating postures of all intervening frames. Also, each posture in frames other than the reference frames being loosely defined, these postures are appropriately modified in such a way that the walking is carried out stably.

Figure 2:
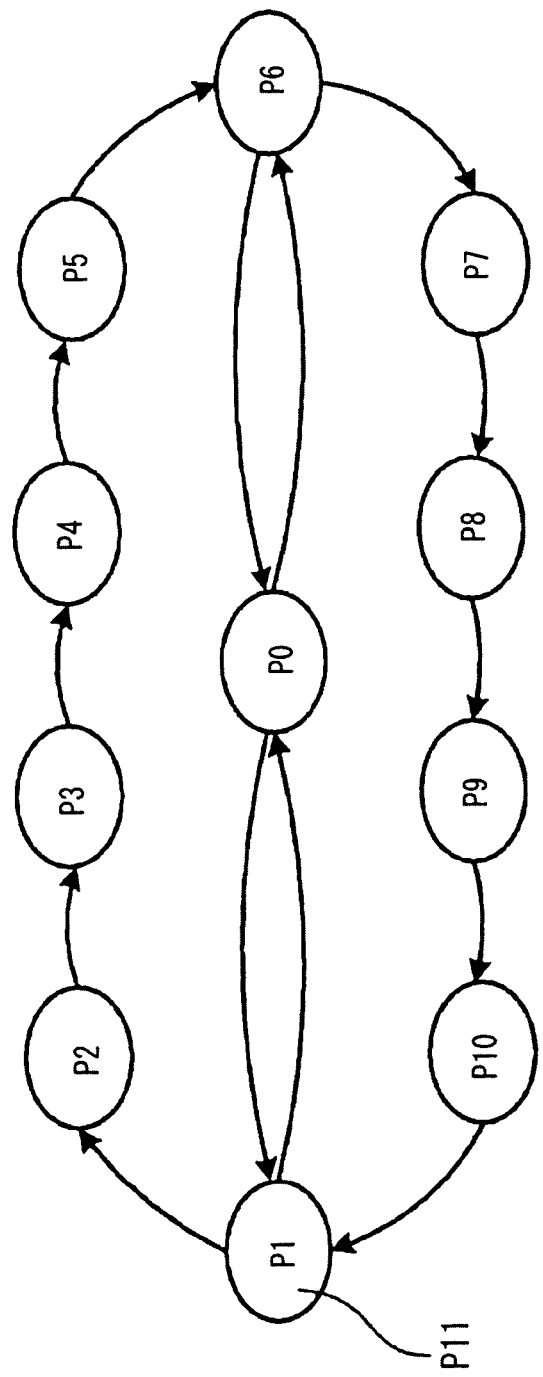
FIG. 2 is a condition transition diagram of each frame P0 to P11.

FIG. 2 is a condition transition diagram corresponding to the frames P0 to P11. A condition of the robot transits from the frame P0 to the reference frame P1 or the reference frame P6. It is noted that reference frame P1 is substantially the same as the reference frame P11. Also, it is also possible for the condition of the robot to transit from the reference frame P1, or the reference frame P6, to the frame P0. In the example of FIG. 1, first, the condition of the robot transits from the frame P0 to the reference frame P1. Subsequently, the condition of the robot transits from the reference frame P2 via the reference frame P10 to the reference frame P11.

In this way, the robot condition is controlled by acquiring frame information, including the reference frames P1, P6 and P11, in which the robot is standing independently without falling over, and interpolating the postures between the frames P0 to P11 in such a way that an operation of the robot attains the postures of the reference frames P1, P6 and P11. As a result thereof, even in the event that the posture of the robot becomes unstable, the posture attains a stable condition in the reference frames. That is, the robot may stably continue the walking motion.

Also, as the robot has stopped the walking, and is in a condition in which it is standing stably, in the reference frames P6 and P11, it is easily possible to change a stride of a subsequent walking operation, change a walking direction, or start a motion other than walking.

Figure 3:
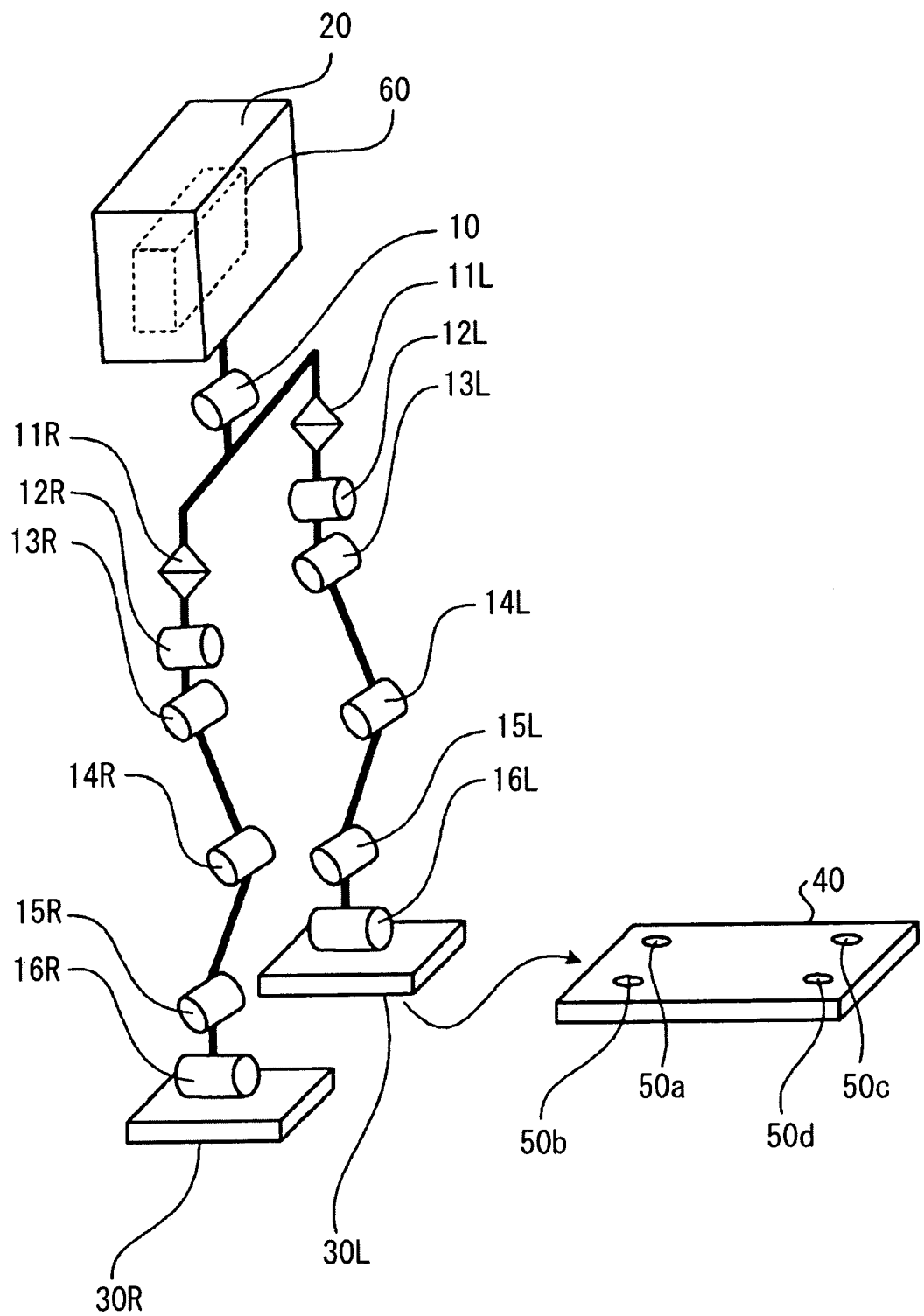
FIG. 3 is an outline diagram of a robot according to the embodiment.

FIG. 3 is an outline diagram of the robot. The robot has a trunk 20, a gyrosensor 60 furnished in the trunk, and two legs (i.e., a right leg 30R and a left leg 30L. Also, each leg has six joints. That is, a degree of freedom of each leg is six. The quantity of joints is optional.

In FIG. 3, the joints include a pitch waist joint 10, a right yaw hip joint 11R, a left yaw hip joint 11L, a right roll hip joint 12R, a left roll hip joint 12L, a right pitch hip joint 13R, a left pitch hip joint 13L, a right pitch knee joint 14R, a left pitch knee joint 14L, a right pitch ankle joint 15R, a left pitch ankle joint 15L, a right roll ankle joint 16R, and a left roll ankle joint 16L. A motor (not shown) is embedded in each joint. The motor of each joint controls a movement of the respective joint. Also, a position sensor (not shown) is embedded in each joint. The position sensor of each joint detects a movement, specifically a degree of rotation, of the respective joint, for example.

The pitch waist joint 10 controls a forward-backward movement (pitching) of the trunk 20. The right yaw hip joint 11R and the left yaw hip joint 11L cause a rotating movement of the robot to left or right (yawing) at a groin portion of the respective leg.

The right roll hip joint 12R and the left roll hip joint 12L cause a sideways rotation of the robot (rolling) at the groin portion of the respective leg. The right pitch hip joint 13R and the left pitch hip joint 13L cause a forward-backward rotation of the robot (pitching) at the groin portion of the respective leg.

Also, the right pitch knee joint 14R and the left pitch knee joint 14L cause a forward-backward movement of the robot (pitching) at a respective knee portion. The right pitch ankle joint 15R and the left pitch ankle joint 15L cause a forward-backward movement of the robot (pitching) at a respective ankle portion. The right roll ankle joint 16R and the left roll ankle joint 16L cause a sideways movement of the robot (rolling) at the respective ankle portion.

Also, a sole is attached to each leg. In FIG. 3, a sole 40 attached to the left leg 30L is shown. Four force sensors are embedded in each sole, for example. The quantity of force sensors is optional. In FIG. 3, force sensors 50a to 50d are depicted on the sole 40. These force sensors measure a reaction force received by the sole 40 from a surface, e.g., the floor, for example. The reaction force measured by the force sensors is used in a robot movement compliance control and feedback control.

The gyrosensor 60 measures an angle of rotation of the trunk 20 in a sideways (rolling) direction and a forward-backward (pitching) direction. The angles of rotation measured by the gyrosensor 60 are used in the robot movement feedback control.

Figure 4:
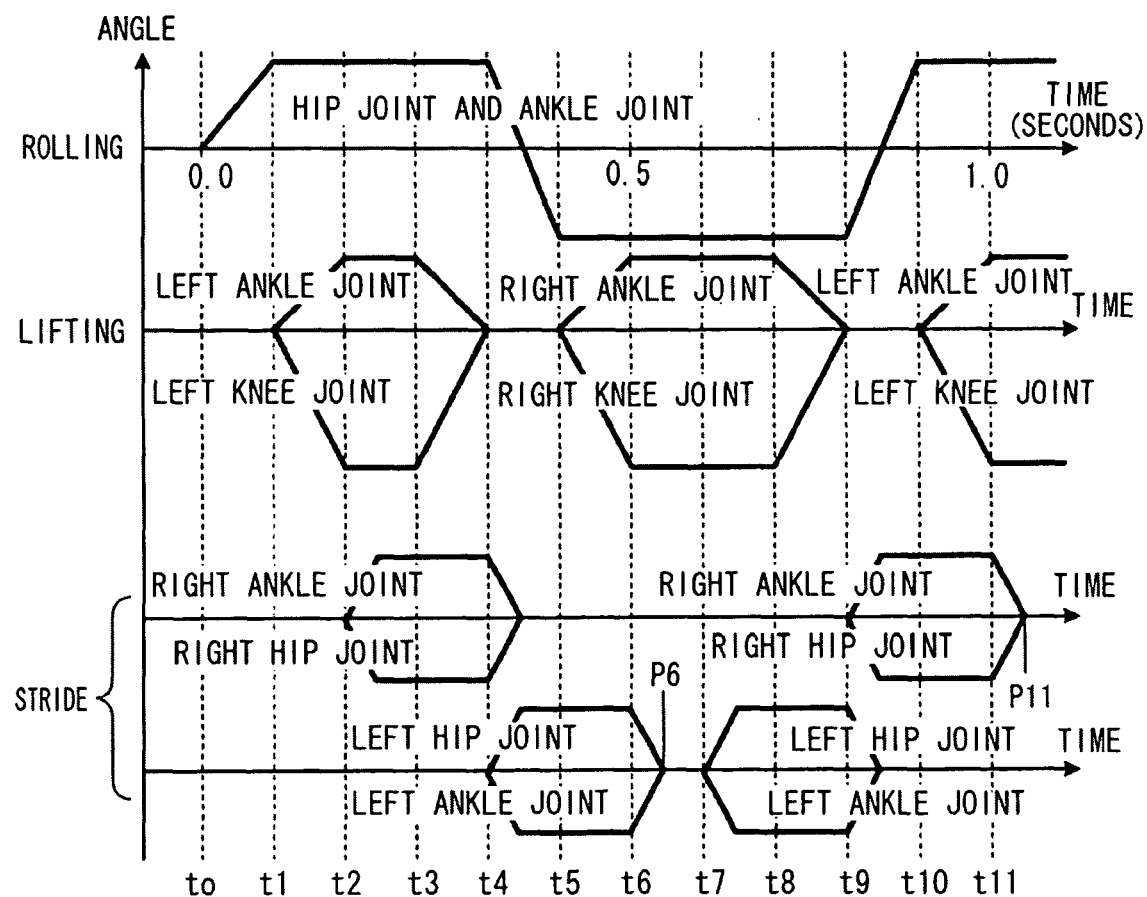
FIG. 4 is a time chart illustrating a walking motion of the robot.

FIG. 4 is a time chart illustrating the walking motion of the robot. At a time t0, the right roll hip joint 12R, the left roll hip joint 12L, the right roll ankle joint 16R, and the left roll ankle joint 16L carry out a rolling operation, tilting both legs to a robot's right side, in order to lift the left leg 30L. When carrying out this rolling operation, movements of the right roll hip joint 12R, the left roll hip joint 12L, the right roll ankle joint 16R, and the left roll ankle joint 16L differ slightly by an amount of a gear backlash compensation, for example.

An amplitude of the rolling operation may be determined by trial and error. Alternatively, the amplitude of the rolling operation may be determined by carrying out the feedback control in such a way that an evaluation function of a rolling angle of the trunk 20 is at a minimum, for example.

At a time t1, the right roll hip joint 12R, the left roll hip joint 12L, the right roll ankle joint 16R, and the left roll ankle joint 16L stop the rolling operation. Then, in order to lift the left leg 30L, that is, in order to carry out a lifting operation of the left leg 30L, the left pitch knee joint 14L rotates in such a way as to retract the left leg 30L, and the left pitch ankle joint 15L rotates in such a way as to retract the left ankle.

At a time t2, the left pitch knee joint 14L and the left pitch ankle joint 15L stop the lifting operation. Then, the right pitch hip joint 13R and the right pitch ankle joint 15R rotate, carrying out a pitching operation in such a way that the trunk 20 moves forward.

Between the time t2 and a time t3, the right pitch hip joint 13R and the right pitch ankle joint 15R stop the pitching operation.

At the time t3, the left pitch knee joint 14L, in order to cause the left leg 30L to land on the floor, rotates in such a way as to extend the left leg 30L, and the left pitch ankle joint 15L rotates in such a way as to extend the left ankle.

At a time t4, the left leg 30L lands on the floor. In addition, the right roll hip joint 12R, the left roll hip joint 12L, the right roll ankle joint 16R, and the left roll ankle joint 16L carry out a rolling operation, tilting both legs to a robot's left side, in order to lift the right leg 30R. Furthermore, the right pitch hip joint 13R and the right pitch ankle joint 15R rotate in such a way as to return to the original condition, that is, the condition at the time t2. Furthermore, in order to thrust the right leg 30R forward, the left pitch hip joint 13L and the left pitch ankle joint 15L rotate, carrying out a pitching operation in such a way that the trunk 20 moves forward.

Between the time t4 and a time t5, the right pitch hip joint 13R and the right pitch ankle joint 15R return to the original condition and the left pitch hip joint 13L and the left pitch ankle joint 15L stop the pitching operation.

Then, at the time t5, the right roll hip joint 12R, the left roll hip joint 12L, the right roll ankle joint 16R, and the left roll ankle joint 16L stop the rolling operation. Furthermore, in order to lift the right leg 30R, that is, in order to carry out a lifting operation of the right leg 30R, the right pitch knee joint 14R rotates in such a way as to retract the right leg 30R, and the right pitch ankle joint 15R rotates in such a way as to retract the right ankle.

At a time t6, the right pitch knee joint 14R and the right pitch ankle joint 15R stop the lifting operation. Furthermore, the left pitch hip joint 13L and the left pitch ankle joint 15L rotate in such a way as to return to the original condition, that is, the condition at the time t4.

Between the time t6 and a time t7, the left pitch hip joint 13L and the left pitch ankle joint 15L return to the original condition. As a result thereof, the posture of the robot is set at the posture defined in the reference frame P6. That is, the linear speed of the robot is zero, the robot is standing on only the left leg 30L, and the stride is zero.

At the time t7, in order to thrust the right leg 30R forward, the left pitch hip joint 13L and the left pitch ankle joint 15L rotate, carrying out a pitching operation in such a way that the trunk 20 moves forward.

Between the time t7 and a time t8, the left pitch hip joint 13L and the left pitch ankle joint 15L stop the pitching operation. At the time t8, the right pitch knee joint 14R, in order to cause the right leg 30R to land on the floor, rotates in such a way as to extend the right leg 30R, and the right pitch ankle joint 15R rotates in such a way as to extend the right ankle.

At a time t9, the right leg 30R lands on the floor. In addition, the right roll hip joint 12R, the left roll hip joint 12L, the right roll ankle joint 16R, and the left roll ankle joint 16L carry out a rolling operation, tilting both legs to the robot's right side, in order to lift the left leg 30L. Furthermore, in order to thrust the left leg 30L forward, the right pitch hip joint 13R and the right pitch ankle joint 15R rotate, carrying out a pitching operation in such a way that the trunk 20 moves forward. Furthermore, the left pitch hip joint 13L and the left pitch ankle joint 15L rotate in such a way as to return to the original condition, that is, the condition at the time t7.

At a time t10, the right roll hip joint 12R, the left roll hip joint 12L, the right roll ankle joint 16R, and the left roll ankle joint 16L stop the rolling operation. Furthermore, in order to lift the left leg 30L, that is, in order to carry out a lifting operation of the left leg 30L, the left pitch knee joint 14L rotates in such a way as to retract the left leg 30L, and the left pitch ankle joint 15L rotates in such a way as to retract the left ankle.

At a time t11, the left pitch knee joint 14L and the left pitch ankle joint 15L stop the lifting operation. Furthermore, the right pitch hip joint 13R and the right pitch ankle joint 15R rotate in such a way as to return to the original condition, that is, the condition at the time t9. As a result thereof, the posture of the robot is set at the posture defined in the reference frame P11.

From the time t11 onward, the right pitch hip joint 13R and the right pitch ankle joint 15R return to the original condition. As a result thereof, the posture of the robot is set at the posture defined in the reference frame P11. That is, the linear speed of the robot is zero, the robot is standing on only the right leg 30R, and the stride is zero. By repeating this kind of movement, the walking motion of the robot is realized.

Figure 5:
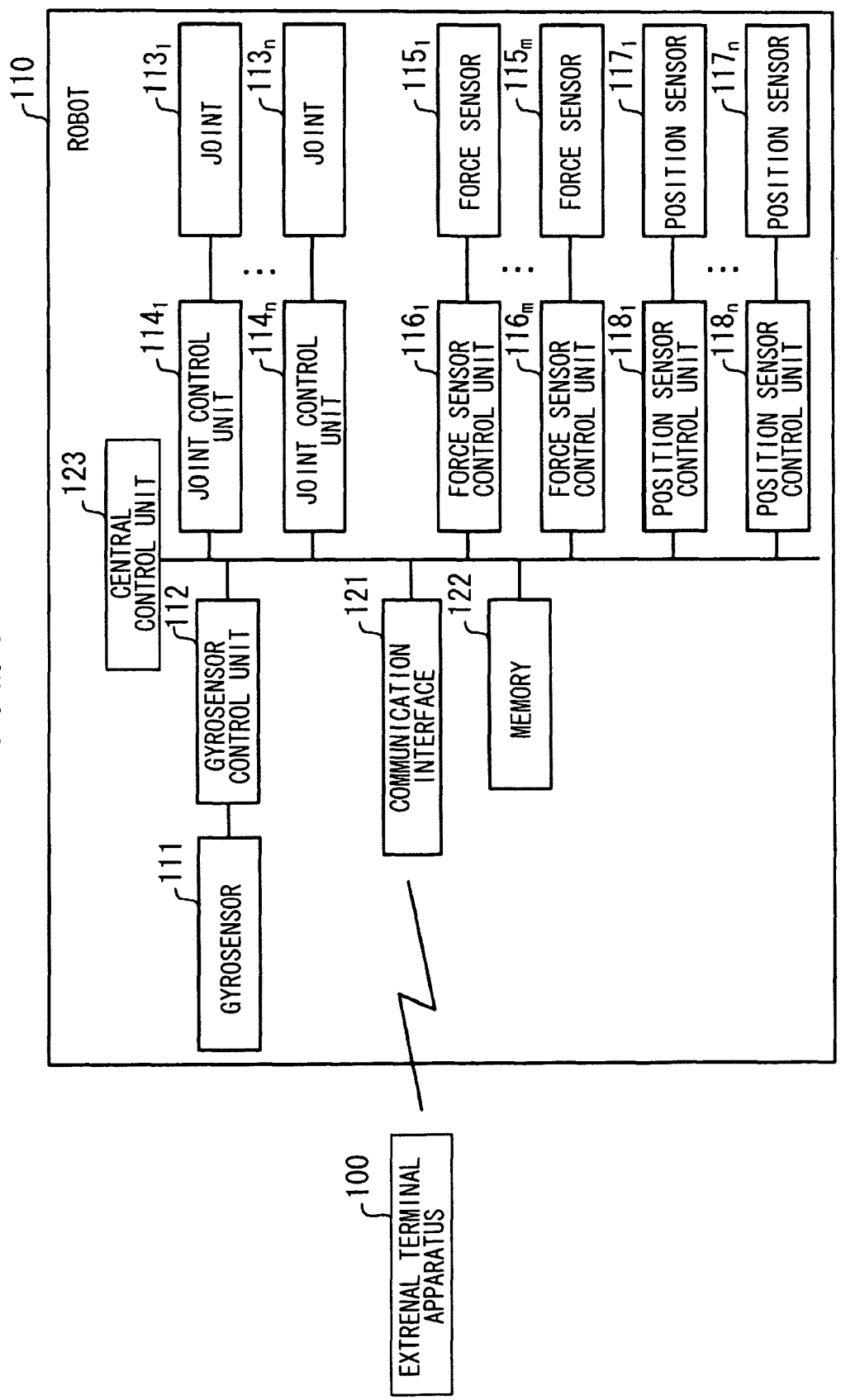
FIG. 5 is a functional block diagram of a robot control system according to the embodiment.

FIG. 5 is a functional block diagram of a robot control system according to an example of an embodiment. The robot control system includes an external terminal apparatus 100 and a robot 110, for example.

The external terminal apparatus 100 may be a personal computer, for example. The personal computer may be operated by an operator who manages an operation of the robot. The external terminal apparatus 100 communicates with the robot 110. The communication includes giving and receiving of various information.

The external terminal apparatus 100 may transmit preset robot 110 frame information, information on a command to the robot 110, etc., to the robot 110. The external terminal apparatus 100 may also receive information relating to a condition (e.g., a posture, a speed, etc.) of the robot 110 from the robot 110. The information obtained from the robot 110 may be displayed on a display device (not shown).

The robot 110 is, for example, a bipedal humanoid robot. Referring to FIG. 5, the robot 110 includes a gyrosensor 111, a gyrosensor control unit 112, joints 1131 to 113$n$ ($n$ is a positive integer), joint control units 1141 to 114$n$, force sensors 1151 to 115$m$ ($m$ is a positive integer), force sensor control units 1161 to 116$m$, position sensors 1171 to 117$n$, position sensor control units 1181 to 118$n$, a communication interface 121, a memory 122, and a central control unit 123.

The gyrosensor 111 has substantially the same structure and performs substantially the same kind of functions as the gyrosensor 60 shown in FIG. 3. The gyrosensor 111 is may be included in or on the trunk 20 of the robot 110, and measures the angle of rotation of the trunk 20 in the sideways (rolling) direction, and the forward-backward (pitching) direction. The gyrosensor control unit 112 controls the functions of the gyrosensor 111 and transmits information on the angles of rotation measured by the gyrosensor 111 to the central control unit 123.

The joints 1131 to 113$n$ move the robot 110. Motors (not shown) drive the joints. The pitch waist joint 10, the right yaw hip joint 11R, the left yaw hip joint 11L, the right roll hip joint 12R, the left roll hip joint 12L, the right pitch hip joint 13R, the left pitch hip joint 13L, the right pitch knee joint 14R, the left pitch knee joint 14L, the right pitch ankle joint 15R, the left pitch ankle joint 15L, the right roll ankle joint 16R, and the left roll ankle joint 16L, depicted in FIG. 3, may be included in the joints.

The joint control units 1141 to 114$n$ control an operation of each of the respective joint 1131 to 113$n$. In particular, the joint control units 1141 to 114$n$ control in such a way that the joints 1131 to 113$n$ rotate through a specified angle at a specified angular speed, at a specified time, for example. The angle, angular speed and time may be specified by the central control unit 123, for example.

The force sensors 115 1 to 115m are provided on the soles of the right leg 30R and left leg 30L of the robot 110, for example. The force sensors 115 1 to 115m measure the reaction force from the floor. The force sensors 115 1 to 115m may have substantially the same structure and performs substantially the same kind of function as the force sensors 50a to 50d illustrated in FIG. 3. The force sensor control units 116 1 to 116m control the function of the respective force sensors 115 1 to 115m and transmit information on the reaction force measured by the respective force sensors 115 1 to 115m to the central control unit 123.

The position sensors 117 1 to 117n are attached to the respective joints 113 1 to 113n and detect a position of the respective joints 113 1 to 113n. Specifically, the position sensors 117 1 to 117n may detect an angle of rotation of the respective joints 113 1 to 113n, for example. The position sensor control units 118 1 to 118n control an operation of each position sensor 117 1 to 117n and transmit the position information measured by the position sensors 117 1 to 117n to the central control unit 123.

The communication interface 121 communicates with the external terminal apparatus 100. For example, the communication interface 121 may carry out wireless communication and/or a wired communication with the external terminal apparatus 100.

The memory 122 stores various information. For example, the memory 122 may store information received from the external terminal apparatus 100 and/or information transmitted to the external terminal apparatus 100, as well as information relating to results of various calculations performed by the central control unit 123.

The central control unit 123 may control the entire robot 110. The central control unit 123, for example, based on frame information received from the external terminal apparatus 100, calculates the rotation starting time, the angular speed, the angle of rotation, and the like, of each joint 113 1 to 113n when the robot 110 operates, and transmits results thereof to the joint control units 114 1 to 114n.

Also, the central control unit 123 accepts a robot 110 operation control request from the external terminal apparatus 100, via the communication interface 121. The operation control request may include a stride change request, a walking direction change request, or a request to execute an operation other than the walking.

The central control unit 123 executes the heretofore described requests after the postures of the reference frames P1, P6 and P11 have been realized. When executing a request, the central control unit 123 transmits information on the rotation starting time, the angular speed, the angle of rotation, and the like, of the joint 113 1 to 113n corresponding to the requested operation to the relevant joint control unit 114 1 to 114n. As the robot 110 is standing stably on one leg in the reference frames P1, P6 and P11, it is expedient to execute the heretofore described requests when the robot 110 is standing in a posture corresponding to the reference frame P1, P6 or P11.

Although it is taken here that the central control unit 123 calculates the various parameters, it is also acceptable to adopt a configuration wherein the external terminal apparatus 100 calculates the various parameters, and controls the robot. In the event of adopting this kind of configuration, the external terminal apparatus 100 receives information used to calculate the rotation starting time, the angular speed, the angle of rotation, and the like, from the robot 110, and calculates each parameter based on the information received. The joint control units 114 1 to 114n receive information on calculation results from the external terminal apparatus 100, and carry out operation control of the robot 110 based on the information received.

Figure 6:
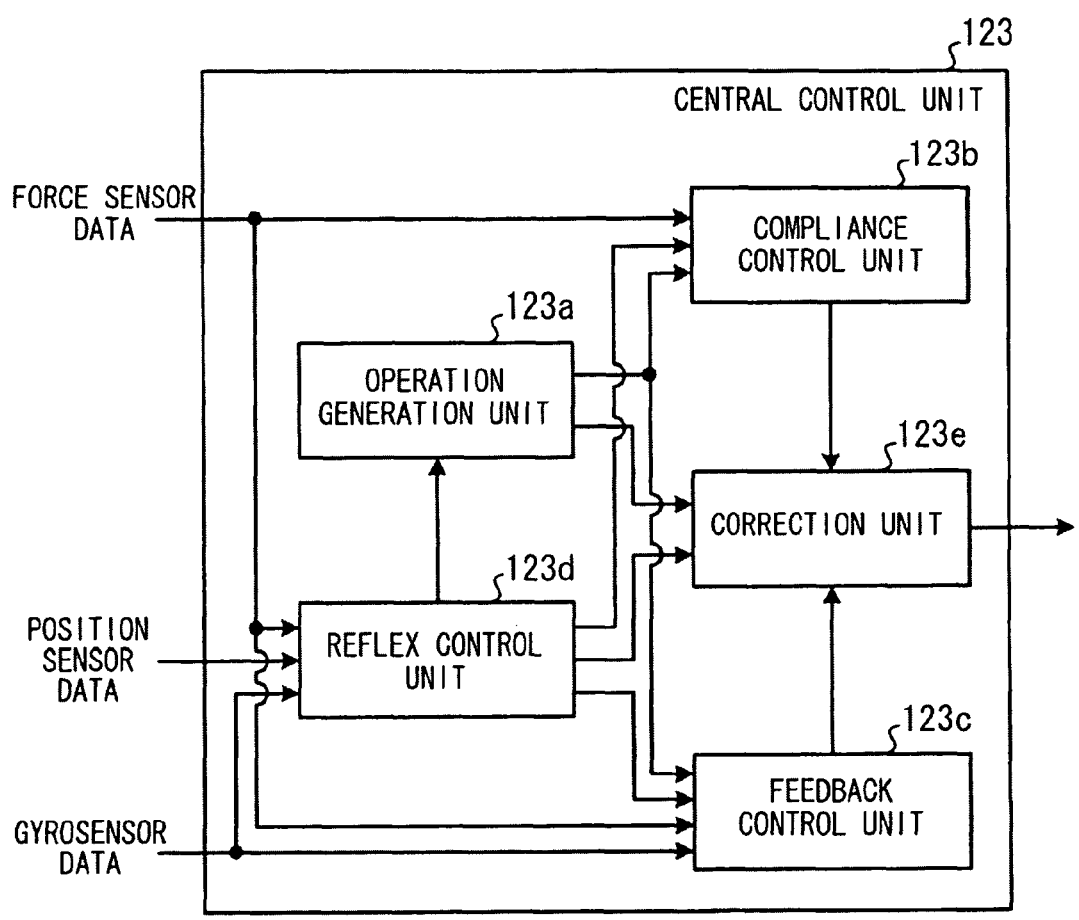
FIG. 6 is a functional block diagram showing a configuration of a central control unit.

Hereafter, a detailed description of a robot control process carried out by the central control unit 123 is provided. FIG. 6 is a functional block diagram showing a configuration of the central control unit 123. As shown in the diagram, the central control unit 123 has an operation generation unit 123a, a compliance control unit 123b, a feedback control unit 123c, a reflex control unit 123d, and a correction unit 123e.

The operation generation unit 123a is a processing unit which, based on frame information received from the external terminal apparatus 100 via the communication interface 121, calculates the rotation starting time, the angular speed, the angle of rotation, and the like, of each joint 113 1 to 113n when the robot 110 operates, and transmits the calculated rotation starting time, the angular speed, the angle of rotation, and the like to the correction unit 123e. Also, the operation generation unit 123a passes phase information, indicating which phase among a rolling phase, a lifting phase, and a landing phase, the robot 110 is in, to the compliance control unit 123b and feedback control unit 123c.

The compliance control unit 123b is a processing unit which carries out a compliance control of a landing operation, and the like, based on force sensor data measured by the force sensors 115 1 to 115m and the phase information received from the operation generation unit 123a, calculates an amount of compliance control and transmits the calculated amount of compliance control to the correction unit 123e.

The feedback control unit 123c is a processing unit which carries out gyro feedback control based on gyrosensor data measured by the gyrosensor 111, and a ZMP feedback control based on the force sensor data measured by the force sensors 115 1 to 115m. The feedback control unit 123c calculates an amount of feedback control and transmits the calculated amount of feedback control to the correction unit 123e.

Figure 7:
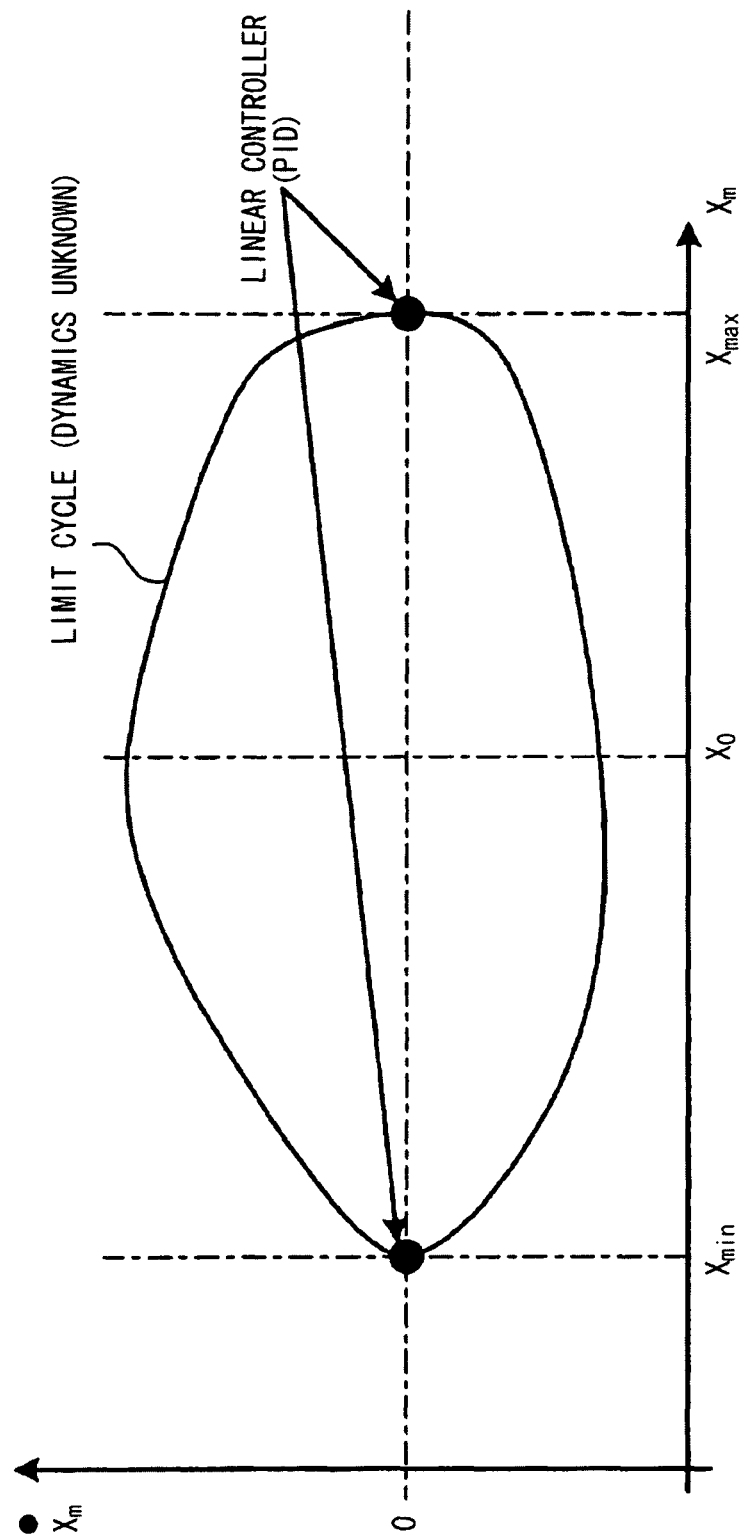
FIG. 7 is an illustration for illustrating a method of controlling the robot with the central control unit.

FIG. 7 is an illustration for illustrating a method of controlling the robot with the central control unit 123. The illustration, showing a relationship between a ZMP x coordinate (xm) and a speed thereof (dxm/dt), shows a trajectory corresponding to a one cycle operation of the robot. Points at which x=Xmin and x=Xmax correspond to cases in which the robot is in a stable condition standing on one foot and the feedback control is in effect.

Figure 8:
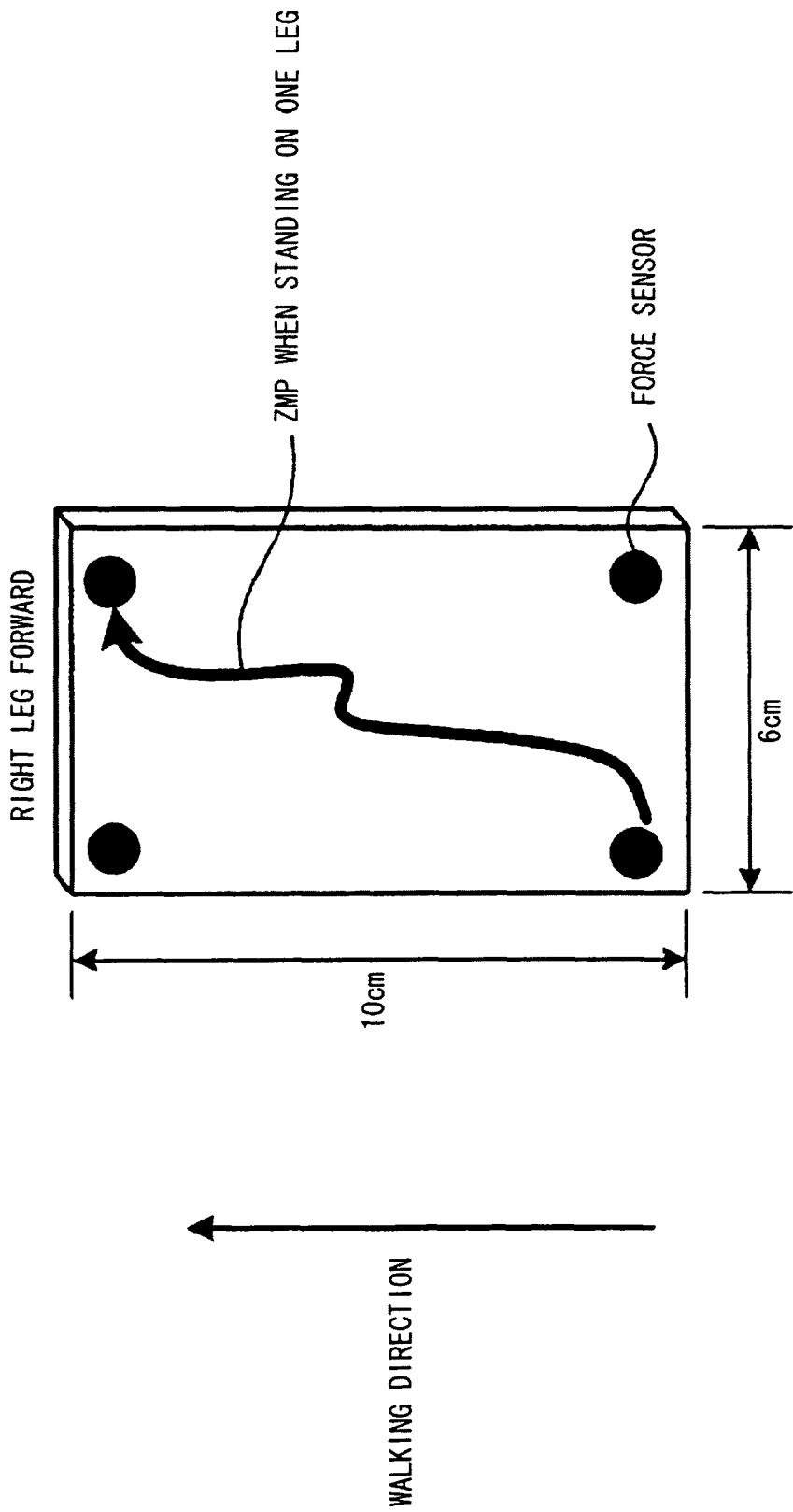
FIG. 8 is a diagram showing a movement of a ZMP.

FIG. 8 indicates, with a broad arrow, a regular ZMP trajectory in the case in which the robot 110 is standing on only the right foot 30R while walking. In the event that the robot 110 attempts to land on an obstacle while walking, the ZMP deviates from the regular trajectory.

Figure 9:
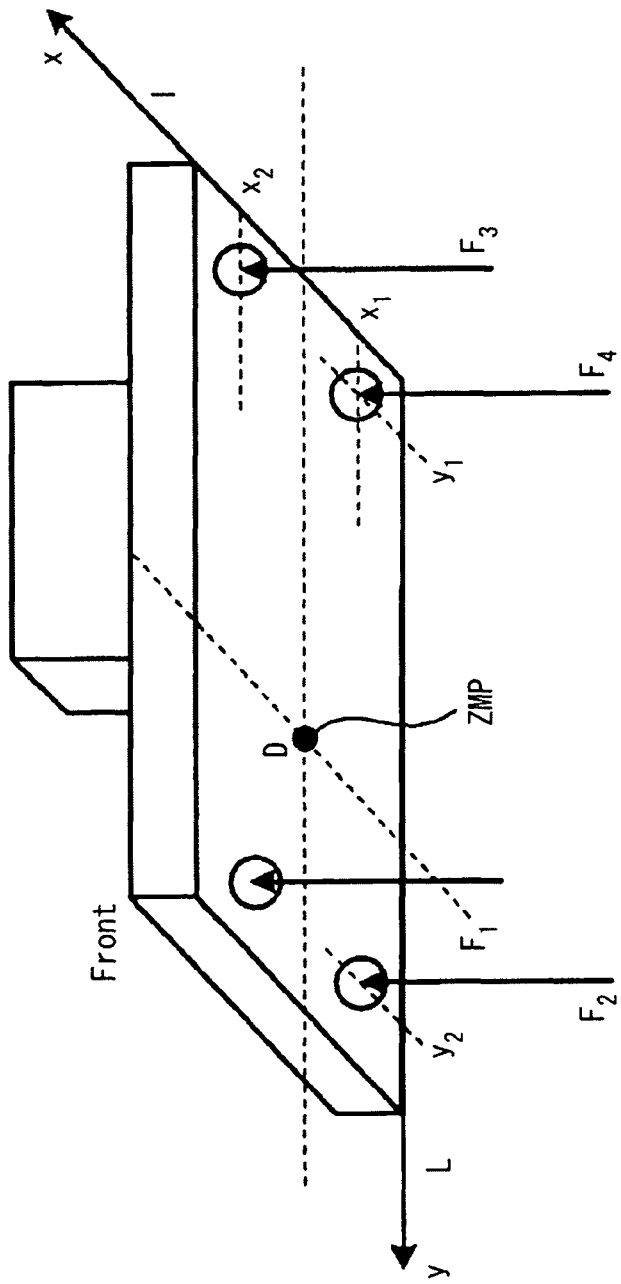
FIG. 9 is a diagram showing a method of calculating the ZMP with a feedback control unit.

The feedback control unit 123c calculates a ZMP using the force sensor data. FIG. 9 is a diagram showing a method of calculating the ZMP with the feedback control unit 123c. As shown in the diagram, the feedback control unit 123c calculates the ZMP (xm, ym) using four items of force sensor data F1 to F4, and coordinates at which the force sensors are attached.

The reflex control unit 123d is a processing unit which detects an obstacle on a walking surface and carries out a reflex control in such a way that the robot 110 stabilizes with respect to the obstacle. The reflex control is carried out using the force sensor data measured by the force sensors 115 1 to 115m, position sensor data measured by the position sensors 117 1 to 117n, and the gyrosensor data measured by the gyrosensor 111, for example.

The correction unit 123e is a processing unit which corrects the rotation starting time, the angular speed, the angle of rotation, and the like, calculated for each joint 1131 to 113n by the operation generation unit 123a, by an output of the compliance control unit 123b, the feedback control unit 123c, and the reflex control unit 123d, and transmits a command to the motor of each joint 1131 to 113n.

Next, a detailed description is provided for a reflex control controlled by the reflex control unit 123d. An obstacle on the walking surface is detected by the force sensors 115l to 115m. The reflex control unit 123d, when a force is detected by the force sensors 115l to 115m before a regular time of arrival at the walking surface, stops the walking operation of the robot 110, and carries out an operation of rolling onto a supporting leg and an operation of returning a swing leg to a position before swinging, so that the robot 110 returns to the stable condition.

Figure 10:
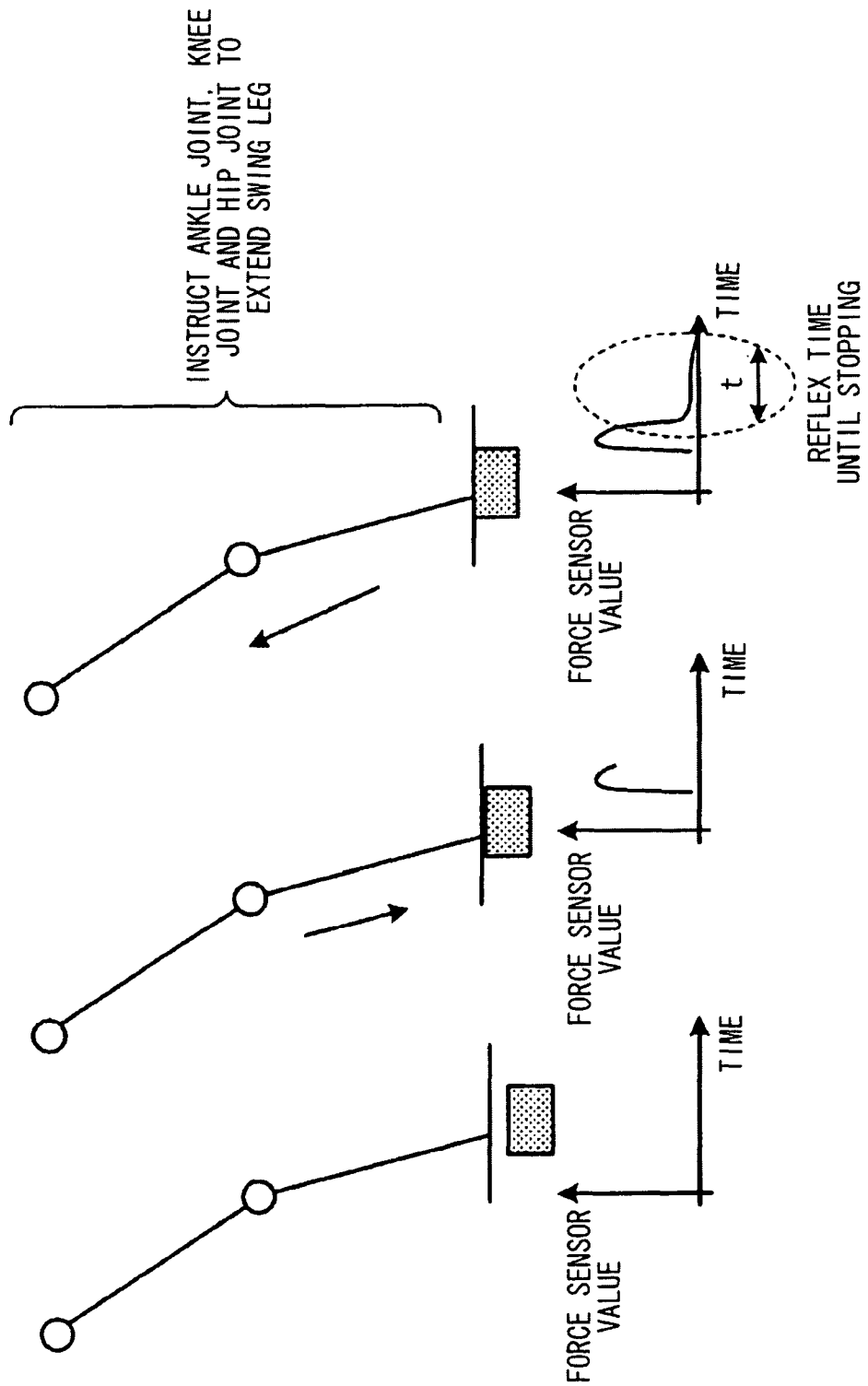
FIG. 10 is an illustration for illustrating a reflex control when an obstacle is detected.

FIG. 10 is an illustration for illustrating the reflex control when an obstacle is detected. As shown in the illustration, the reflex control unit 123d, when detecting an obstacle, orders the operation of rolling onto the supporting leg and the operation of returning the swing leg to the position before swinging. In addition, reflex control unit 123d instructs the ankle joint, the knee joint and the hip joint to extend the swing leg for a short time. Specifically, the reflex control unit 123d, as well as inverting a compliance control gain code for just a small amount of time, instructs the ankle joint, the knee joint and the hip joint to extend the swing leg for a short time, by controlling an output of the compliance control.

Figure 11:
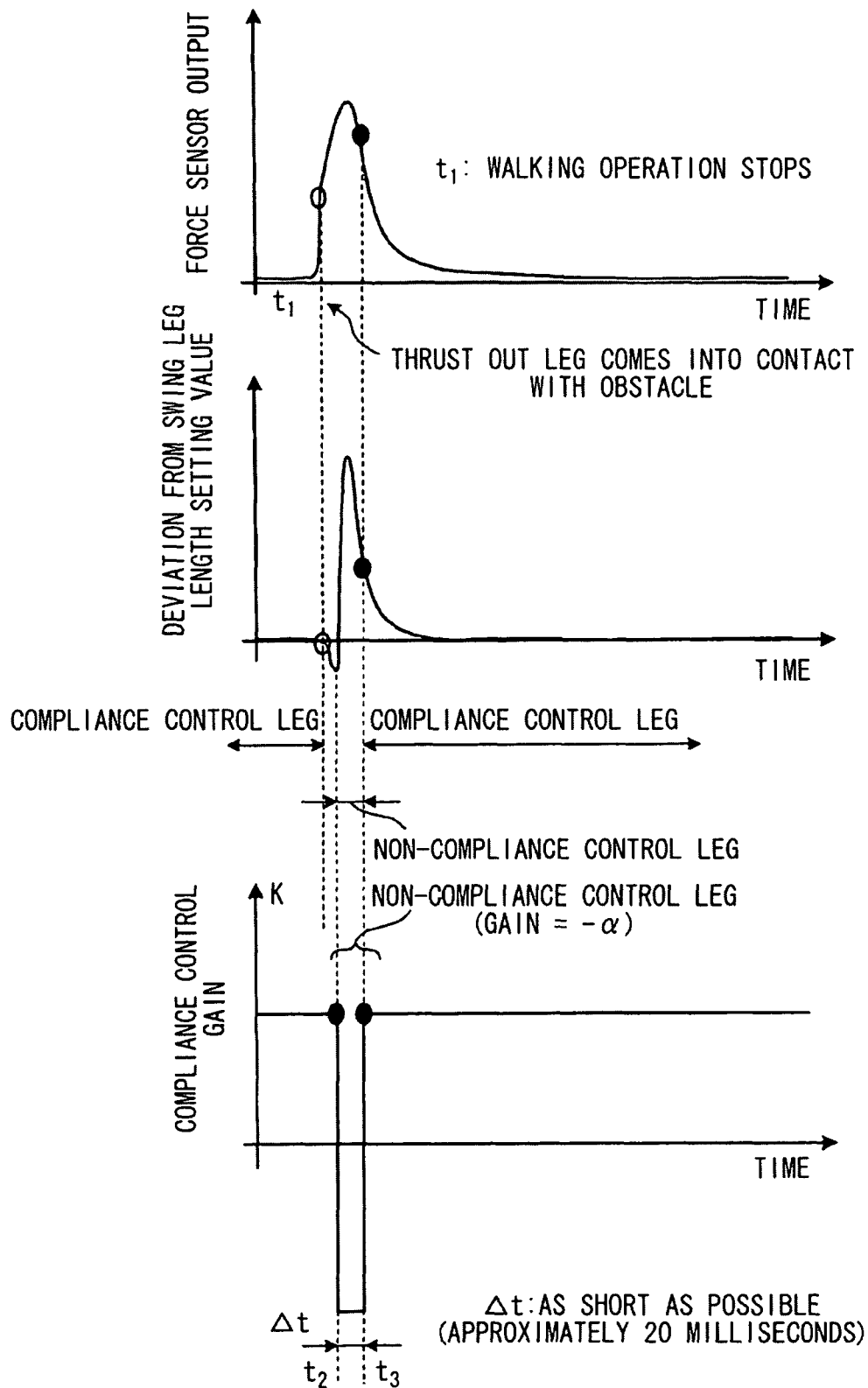
FIG. 11 is a diagram showing a force sensor output, a deviation from a swing leg length setting value, and a compliance control gain when a swing leg comes into contact with an obstacle.

FIG. 11 is a diagram showing a force sensor output, a deviation from a swing leg length setting value, and the compliance control gain when the swing leg comes into contact with an obstacle. In the diagram, t0 indicates a point at which the obstacle is detected by the force sensor output, t2 indicates a point at which the compliance control gain code is inverted by the reflex control unit 123d, and t3 indicates a point at which the compliance control gain code is returned to the original.

Upon the swing leg coming into contact with an obstacle, the swing leg length becomes shorter than the setting value until t2, when the compliance control gain code is inverted, becomes momentarily longer than the setting value when the obstacle is detected, then returns to the setting value after a while. A time interval $\Delta t$ between t2 and t3 being approximately 20 milliseconds, this $\Delta t$ is made as short as possible. The reflex control unit 123d inverts the compliance control gain code for the duration of $\Delta t$, interrupting the regular compliance control.

Figure 12:
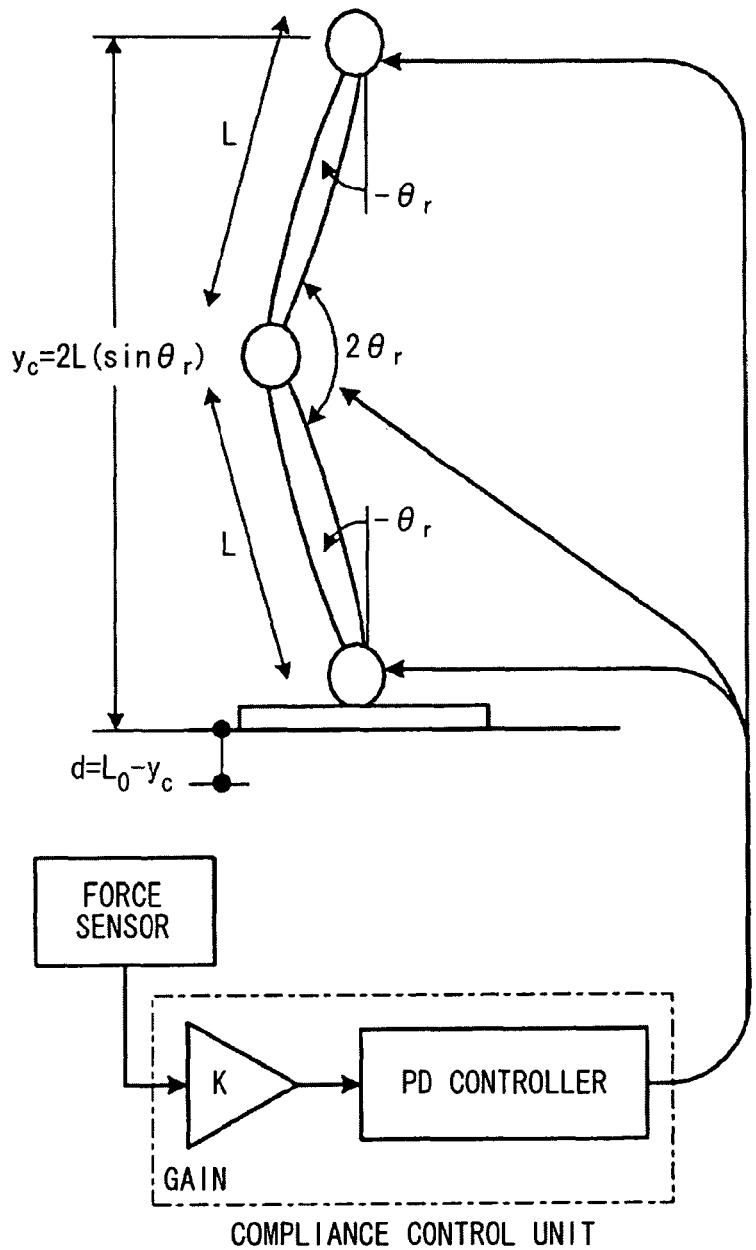
FIG. 12 is an illustration for illustrating bending of a supporting leg.

Also, the reflex control unit 123d, upon detecting the obstacle, instructs the ankle joint, the knee joint and the hip joint to bend the supporting leg for a short time. FIG. 12 is an illustration for illustrating the bending of the supporting leg. As shown in the illustration, when taking the ankle joint, the knee joint and the hip joint to have rotated $-\theta r$, $2\theta r$ and $-\theta r$ respectively in accordance with the instruction of the reflex control unit 123d, a supporting leg length $yc = 2L(\sin \theta r)$, and a deviation d from a supporting leg setting value $= L0 - yc$. Herein, L is a length of the leg between the ankle joint (the knee joint) and the knee joint (the hip joint), and L0 is the supporting leg length setting value. Also, the reflex control unit 123d controls in such a way that d is the same as the swing leg length deviation, that is, the length by which the swing leg length is extended from the setting value.

Figure 13:
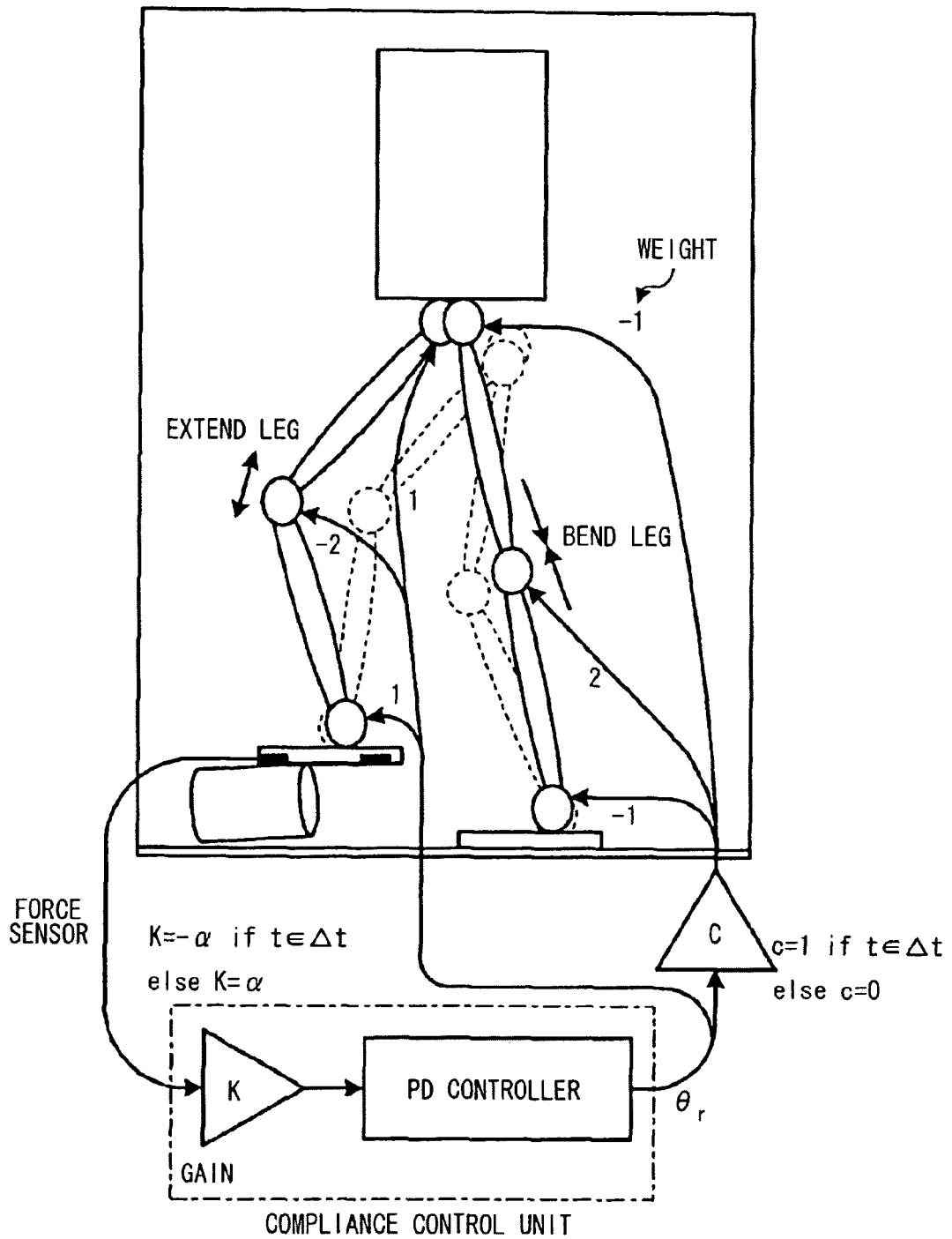
FIG. 13 is an illustration for illustrating reflex controls of both legs together.

FIG. 13 is an illustration for illustrating the reflex controls of both legs together. Solid lines indicate the swing leg and the supporting leg before the reflex control, while dotted lines indicate the swing leg and the supporting leg after the reflex control. As shown in the illustration, the reflex control unit 123d, for the duration of $\Delta t$, inverts a code of a compliance control gain K, instructs the swing leg to extend the leg, and instructs the supporting leg to bend the leg.

In this way, the reflex control unit 123d, on detecting the obstacle, inverting the code of the compliance control gain K, instructing the swing leg to extend the leg, and instructing the supporting leg to bend the leg, for the duration of $\Delta t$, it is possible to return a center of gravity to the supporting leg even after the center of gravity has moved to the swing leg. Accordingly, the likelihood of the robot 110 falling over is reduced.

For regular walking, the joints relating to the pitching operation are controlled by the following equations:

$$\theta am(t) = \theta l(t) + \theta s(t) + \theta c(t)$$

$$\theta km(t) = -2\theta l(t) - 2\theta c(t)$$

$$\theta hm(t) = \theta l(t) - \theta s(t) + \theta c(t)$$

Figure 14:
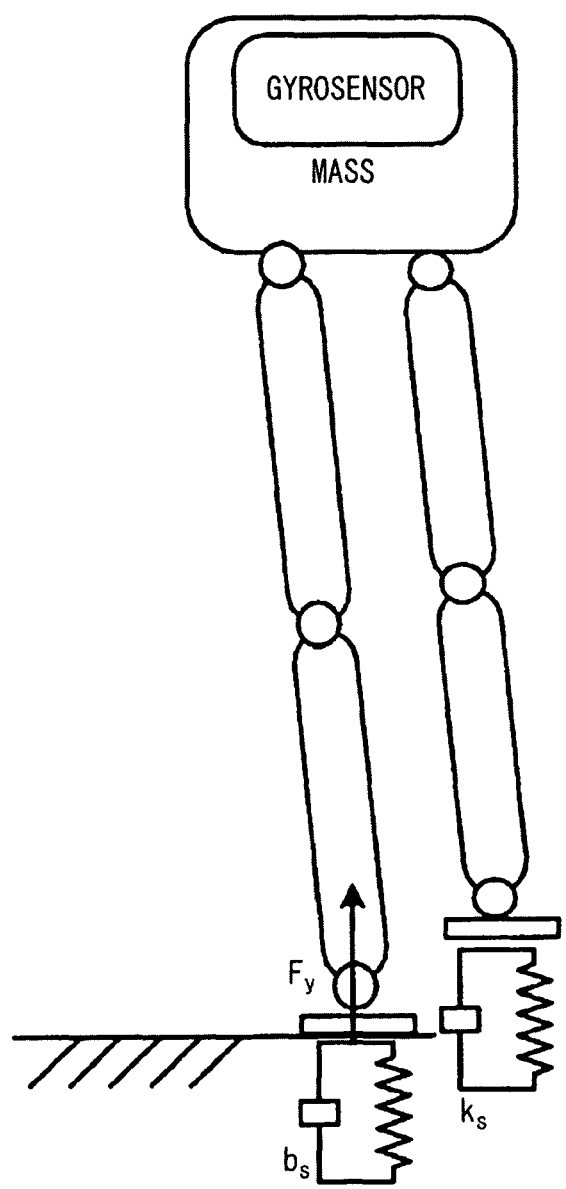
FIG. 14 is a diagram showing a hypothetical damper spring model.

Herein, $\theta l$ is a lifting operation joint angle, $\theta s$ is a stride operation joint angle, and $\theta am$, $\theta km$ and $\theta hm$ are pitching commands for the ankle joint, the knee joint and the hip joint, respectively. Also, $\theta c(t) = \arcsin(yc(t)/L)$ is an angle derived from a hypothetical damper spring model (a compliance control model) shown in FIG. 14 and equation 1.

Equation 1

Also, the reflex control unit 123d, when the robot 110 returns to the stable condition, determines whether or not it is possible to continue the walking operation with respect to the obstacle. The walking is continued in the event of determining that it is possible to continue the walking operation. An instruction from a superior control apparatus is requested in the event of determining that it is not possible to continue the walking operation.

Figure 15:
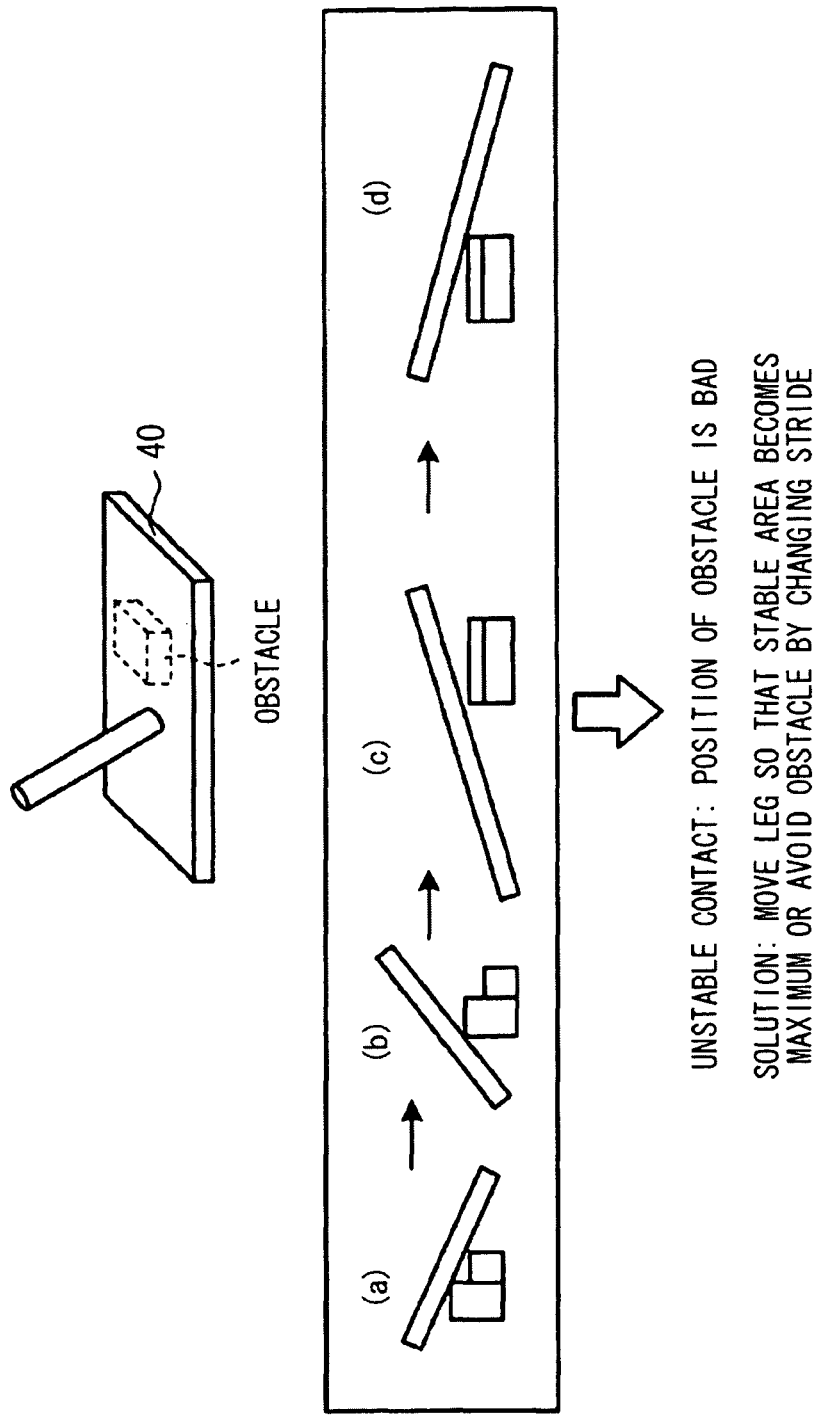
FIG. 15 is an illustration for illustrating an operation when a reflex control unit determines whether or not it is possible to continue the walking while stepping on the obstacle.

Specifically, the reflex control unit 123d determines whether it is possible to continue the walking while stepping on the obstacle, or whether it is possible to step over the obstacle and continue the walking. FIG. 15 is an illustration for illustrating an operation when the reflex control unit 123d determines whether or not it is possible to continue the walking while stepping on the obstacle. In the illustration, (a) and (b) indicate a case of the sole 40 viewed from a front-back direction, while (c) and (d) indicate a case of the sole 40 viewed from a left-right direction.

The reflex control unit 123d, by moving the swing leg onto the obstacle, moving the sole 40 left and right as shown in (a) and (b) and, continuing on, moving the sole 40 forward and backward as shown in (c) and (d), determines whether or not the obstacle forms a stable surface which enables a continued walking. The sole 40 is moved up to half of a maximum range of movement, for example. Then, in the event that the obstacle forms a stable surface which enables continued walking, the reflex control unit 123d continues the walking by moving the leg in such a way that a stable area (a support polygon) for the walking operation is acceptable and/or a maximum, for example.

However, the reflex control unit 123d controls the walking of the robot 110 not under a regular dynamic control, but under a static control. That is, by linearly moving the center of gravity to the swing leg, and gradually increasing a force exerted on the swing leg, the reflex control unit 123d controls in such a way that it is possible to return to the original stable condition in the event that the surface formed by the obstacle becomes unstable due to the increasing of the force exerted on the swing leg. The reflex control unit 123d continues this kind of control of the walking under a static control until an acceptable walking surface is found.

Also, the reflex control unit 123d determines whether or not it is possible to step over the obstacle by changing the stride and, in the event that it is possible to step over the obstacle, controls in such a way as to change the stride, and continue walking. It is also possible to continue the walking in the event that the obstacle moves due to a contact with the robot 110, and the obstacle ceases to be an impediment to the walking.

In the event that the obstacle does not form a stable surface which enables the walking to be continued, and in the event that it is not possible to step over the obstacle even by changing the stride, the reflex control unit 123d determines that it is not possible to continue the walking operation.

In this way, by the reflex control unit 123d determining whether or not it is possible to continue the walking operation with respect to the obstacle, it is possible to continue the walking of the robot 110 as far as possible.

Figure 16:
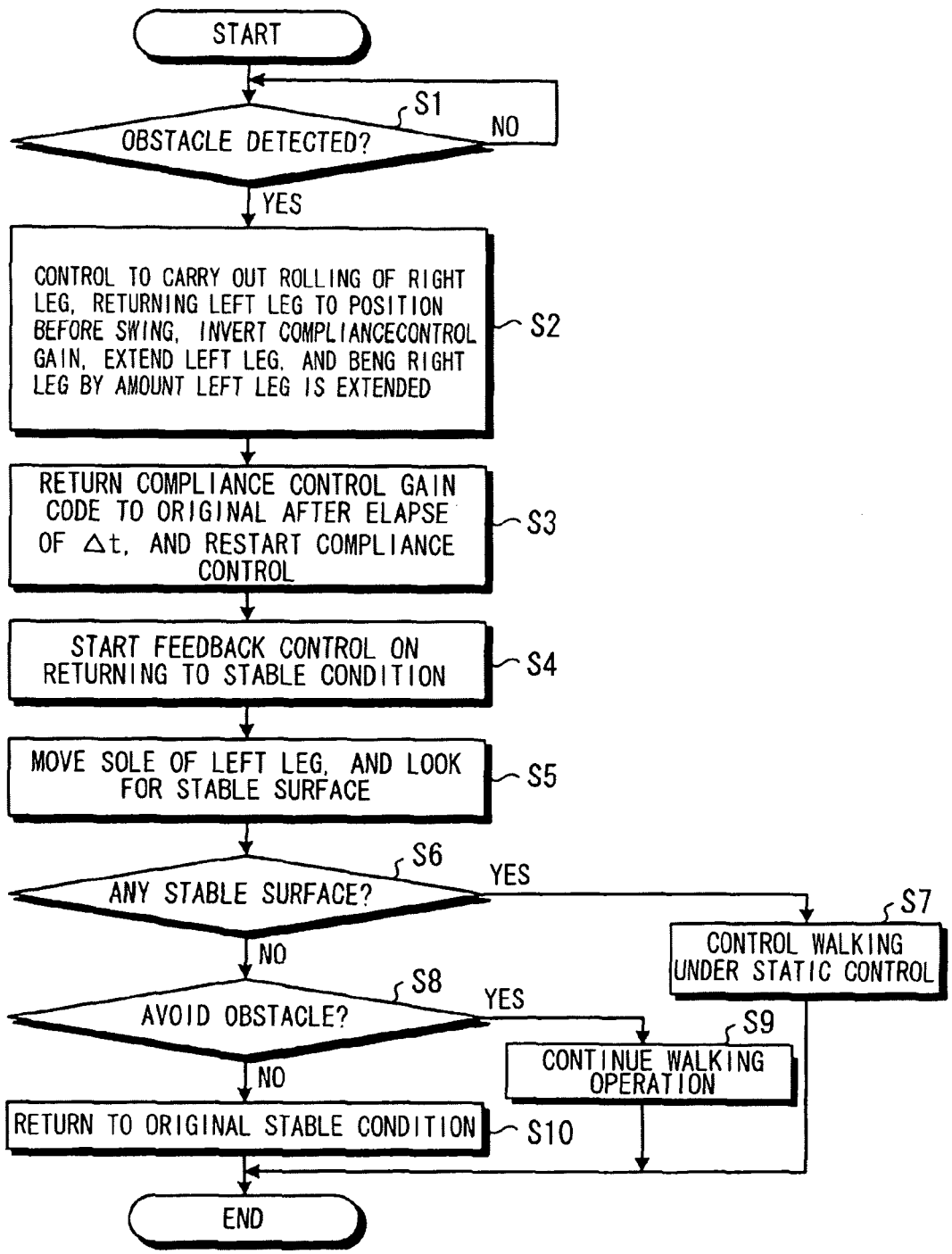
FIG. 16 is a flowchart showing a process procedure of the reflex control by the reflex control unit.

Next, a description of a process procedure of the reflex control performed by the reflex control unit 123d is described. FIG. 16 is a flowchart showing the process procedure of the reflex control by the reflex control unit 123d. Herein, the left leg 30L is the swing leg, a description is provided for the reflex control after the center of gravity has moved to the left leg 30L.

As shown in FIG. 16, the reflex control unit 123d determines, based on force sensor data, whether or not an obstacle has been detected (S1) and, if no obstacle is detected, the reflex control unit 123d continues monitoring for an obstacle.

Meanwhile, if an obstacle is detected, the reflex control unit 123d controls carrying out an operation of rolling onto the right leg 30R and an operation of returning the left leg 30L to a position before swinging, controls in such a way as to invert a compliance control gain code, extend the left leg 30L, and bend the right leg 30R by an amount by which the left leg 30L is extended (S2). Then, the reflex control unit 123d returns the compliance control gain code back to the original control gain code after Δt has elapsed, and restarts the compliance control (S3). Then, upon returning to the stable condition, the reflex control unit 123d starts the feedback control (S4).

Subsequently, the reflex control unit 123d moves the sole 40 of the left leg 30L forward and back as well as left and right, to look for a stable surface on which a continued walking is possible (S5). Further, the reflex control unit 123d determines whether or not there is a stable surface (S6). As a result thereof, if there is a stable surface, the reflex control unit 123d controls the walking under a static control until a level surface is found (S7). For example, in the event that an absolute value of a gyrosensor measurement value is greater than a threshold value, or in the event that a rate of change of a ZMP x coordinate is greater than a threshold value, the reflex control unit 123d controls in such a way that it is possible to return to the stable condition.

Meanwhile, if there is no stable surface, the reflex control unit 123d determines whether or not it is possible to avoid the obstacle by changing the stride (S8). If it is possible to avoid the obstacle, the reflex control unit 123d changes the stride, and continues the walking operation (S9). If it is not possible to avoid the obstacle, the reflex control unit 123d returns the robot to the original stable condition (S10), and receives an instruction from a superior control apparatus.

In this way, the reflex control unit 123d carries out the reflex control with respect to the obstacle in a manner to reduce the likelihood of the robot 110 falling over.

As heretofore described, in an example of an embodiment, the reflex control unit 123d, upon detecting an obstacle, not only carries out an operation of rolling onto the supporting leg and an operation of returning the swing leg to the original stable position, but also controls in such a way as to invert the compliance control gain code for a short time, extend the swing leg, and bend the supporting leg by the amount by which the swing leg is extended. The above described operation reduce the likelihood of the robot 110 falling over, even in the event that the obstacle is detected after the center of gravity has moved to the swing leg.

Also, in the example of an embodiment, once the robot 110 has attained a stable condition after the detection of the obstacle, the reflex control unit 123d moves the sole forward and back and left and right, to look for a stable surface which enables a continuation of the walking and, in the event that there is a stable surface formed by the obstacle, controls in such a way as to walk on the stable surface, so in the event that a response is possible, it is possible to cause the robot 110 to continue walking, even with respect to the obstacle.

Also, as it is taken in an example of an embodiment that the reflex control unit 123d controls the walking under a static control in the event that the robot 110 walks on a stable surface formed by the obstacle, it may be possible to return the robot to the stable condition even in the event that the walking has become unstable.

Although a description of the robot control apparatus has been provided, it is possible to obtain a robot control program stored on a computer-readable medium, which provides the same kind of function, when the program is executed by a computer. Herein, a description is provided of a computer which executes the robot control program stored on a computer-readable medium.

Figure 17:
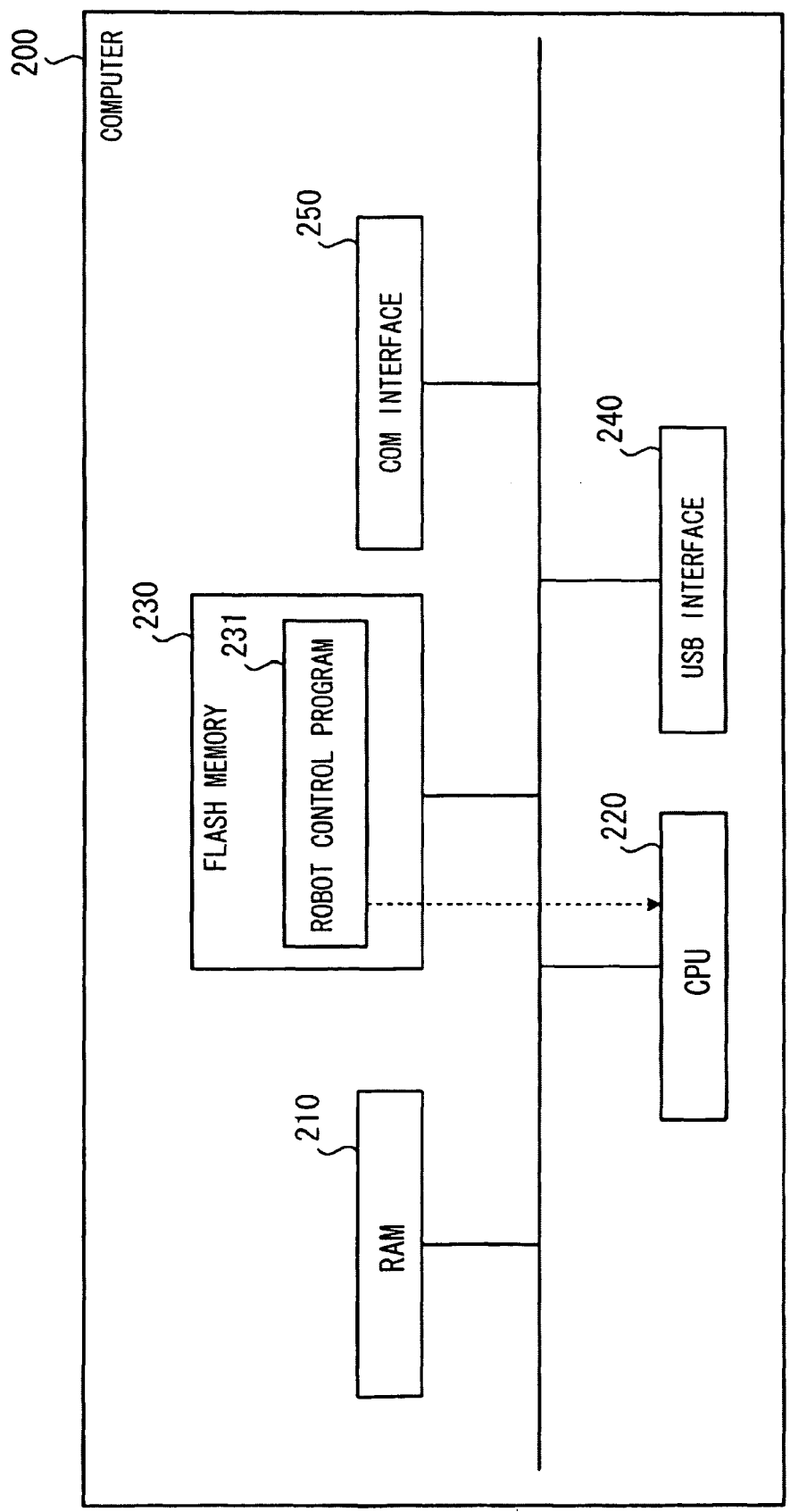
FIG. 17 is a functional block diagram showing a configuration of a computer which executes a robot control program according to the embodiment.

FIG. 17 is a functional block diagram showing a configuration of the computer which executes the robot control program according to the embodiment. Referring to FIG. 17, the computer 200 includes a RAM 210, a CPU 220, a flash memory 230, a USB interface 240, and a COM interface 250.

The RAM 210 is a memory which stores a program, a program interim execution result, and the like, and corresponds to the memory 122 shown in FIG. 5. The CPU 220 is a central processing apparatus which retrieves the program from the RAM 210, and executes it. The flash memory 230 is a non-volatile memory which stores the program and data, and the USB interface 240 is an interface for connecting the computer 200 to the joints and sensors. The COM interface 250 is an interface for communicating with the external terminal apparatus 100 and corresponds to the communication interface 121 shown in FIG. 5. Then, the robot control program 231 executed in the computer 200 is retrieved from the flash memory 230, and executed by the CPU 220.

At least one embodiment of the present invention may also be embodied as computer readable data including executable instructions that are recorded on a computer readable recording medium. The computer readable recording medium is any data storage device that can store the data, including the executable instructions, and which can be read by a computer system so as to provide the computer system with the executable instructions included in the recorded data for execution. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

What is claimed is:

1. A robot control apparatus which controls walking of a robot, the apparatus comprising:
   a walking operation control unit configured to generate control information of various postures at a plurality of differing positions, the postures being set preliminarily in the apparatus and including at least one reference posture in which the robot is standing independently without falling over;
   an obstacle detection unit configured to detect an existence of an obstacle on a surface in which a sole attached to a robot leg lands; and
   when the obstacle is detected by the obstacle detection unit, a reflex control unit controls a robot to,
      return a supporting leg and a swing leg to a position before swinging the swing leg,
      extend the swing leg by an amount, and
      bend the supporting leg by inverting a compliance control gain based on the control information.

2. The robot control apparatus according to claim 1, wherein
   the reflex control unit, once the robot has attained a stable condition, controls the robot to move an ankle joint of the swing leg forward and back, as well as left and right, determines whether the detected obstacle provides a walking surface allowing the walking to continue, and controls the robot to continue the walking if determined that the obstacle provides the walking surface.

3. The robot control apparatus according to claim 2, wherein
   the reflex control unit moves the ankle joint of the swing leg forward and back, left and right, and up to a half of a range of movement of the swing leg, and determines whether the obstacle provides the walking surface.

4. The robot control apparatus according to claim 2, wherein
   the reflex control unit determines a stability of the walking surface while moving a center of gravity to the swing leg and, if determining that the walking surface is unstable, continues the walking under a static control to return the swing leg to a previous position.

5. The robot control apparatus according to claim 4, wherein
   the reflex control unit continues the walking under the static control until a stable, level walking surface is found.

6. A robot control method which controls a walking of a robot by a computer, the method comprising:
   controlling the robot to carry out a walking operation;
   generating control information based on postures at a plurality of differing positions, the postures being set preliminarily in the apparatus and including at least one reference posture in which the robot is standing independently without falling over;
   detecting an obstacle on a surface in which a sole attached to a robot leg lands by an obstacle detection unit, and
   instructing, when the obstacle is detected, the robot to return a supporting leg and a swing leg to a position before swinging the swing leg, to extend the swing leg by an amount, and to bend the supporting leg by inverting a compliance control gain based on the control information.

7. The robot control method according to claim 6, wherein
   the instructing, once the robot has attained a stable condition, instructs the robot to move an ankle joint of the swing leg forward and back, left and right, determines whether the obstacle provides a walking surface allowing the walking to continue, and controls the robot to continue the walking if determining that the obstacle provides the walking surface.

8. The robot control method according to claim 6, wherein
   the instructing instructs the robot to move the ankle joint of the swing leg forward and back, left and right, up to a half of a range of movement of the swing leg, and determines whether the obstacle provides the walking surface.

9. The robot control method according to claim 6, wherein
   the instructing further determines a stability of the provided walking surface while moving a center of gravity to the swing leg and, if the walking surface is determined unstable, continues to instruct the robot to walk under static control to return the swing leg to a previous position.

10. The robot control method according to claim 9, wherein
    the instructing continues to instruct the robot to walk under the static control until a stable, level walking surface is found.

11. A non-transitory computer-readable recording medium storing a robot control program which causes a computer to execute a process, the process comprising:
    generating control information based on postures at a plurality of differing positions, the postures being set preliminarily in the apparatus and including at least one reference posture in which the robot is standing independently without falling over;
    detecting an obstacle on a surface in which a sole attached to a robot leg lands by an obstacle detection unit, and
    instructing, when the obstacle is detected, the robot to return a supporting leg and a swing leg to a position before swinging the swing leg, to extend the swing leg by an amount, and to bend the supporting leg by inverting a compliance control gain based on the control information.

12. The non-transitory computer-readable recording medium according to claim 11, wherein
    the instructing, once the robot has attained a stable condition, instructs the robot to move an ankle joint of the swing leg forward and back, left and right, determines whether the obstacle provides a walking surface allowing the walking to continue, and controls the robot to continue the walking if determining that the obstacle provides the walking surface.

13. The non-transitory computer-readable recording medium according to claim 12, wherein
    the instructing instructs the robot to move the ankle joint of the swing leg forward and back, left and right, up to a half of a range of movement of the swing leg, and determines whether the obstacle provides the walking surface.

14. The non-transitory computer-readable recording medium according to claim 12, wherein
    the instructing further determines a stability of the provided walking surface while moving a center of gravity to the swing leg and, if the walking surface is determined unstable, continues to instruct the robot to walk under static control to return the swing leg to a previous position.

15. The non-transitory computer-readable recording medium according to claim 14, wherein the instructing continues to instruct the robot to walk under the static control unit a stable, level walking surface is found.

16. The robot control apparatus according to claim 1, wherein when the robot is standing in the at least one reference posture, a linear speed of the robot is zero.

\* \* \* \* \*